(12) United States Patent
Lim

(10) Patent No.: US 7,583,014 B2
(45) Date of Patent: Sep. 1, 2009

(54) BACKLIGHT ASSEMBLY AND LIQUID CRYSTAL DISPLAY DEVICE HAVING THE SAME

(75) Inventor: Dae San Lim, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 673 days.

(21) Appl. No.: 11/154,663

(22) Filed: Jun. 17, 2005

(65) Prior Publication Data
US 2006/0126321 A1    Jun. 15, 2006

(30) Foreign Application Priority Data
Dec. 10, 2004    (KR) .................. 10-2004-0103931

(51) Int. Cl.
    *H01J 11/00*    (2006.01)
    *F21V 23/02*    (2006.01)
(52) U.S. Cl. .................... 313/234; 362/260; 362/235
(58) Field of Classification Search .............. 313/234, 313/584–585; 362/260, 225, 227, 235, 244, 362/27, 600, 611, 614, 631–634, 559, 561, 362/821; 40/558; 349/58–69
See application file for complete search history.

(56) References Cited

U.S. PATENT DOCUMENTS 6,331,064 B1 * 12/2001 Nishiyama et al. .......... 362/260
6,674,250 B2 * 1/2004 Cho et al. .................... 315/291
2006/0072322 A1    4/2006 Lee et al.

FOREIGN PATENT DOCUMENTS

| JP | 2005-070308 | 3/2005 |
| JP | 2006-106665 | 4/2006 |
| KR | 2004-078271 | 10/2004 |
| KR | 2004-112984 | 12/2004 |

* cited by examiner

Primary Examiner—Nimeshkumar D. Patel
Assistant Examiner—Anne M Hines
(74) Attorney, Agent, or Firm—McKenna Long & Aldridge

(57) ABSTRACT

A backlight assembly and liquid crystal display device having the same is provided. The backlight assembly includes a plurality of U-type external electrode fluorescent lamps (EEFLs) connected to common electrode parts to reduce the occurrence of short circuits. The a backlight assembly includes a first common electrode part, a second common electrode part arranged parallel to the first common electrode with a predetermined distance in-between, and a plurality of external electrode fluorescent lamps, each having a bent shape and electrically connected to the first and second common electrode parts and a liquid crystal display panel displaying an image according to transmissivity of light supplied from the backlight assembly.

4 Claims, 7 Drawing Sheets

BACKLIGHT ASSEMBLY AND LIQUID CRYSTAL DISPLAY DEVICE HAVING THE SAME

This application claims the benefit of Korean Application No. 2004-103931 filed on Dec. 10, 2004, which is hereby incorporated by reference for all purposes as if fully set forth herein.

BACKGROUND OF THE INVENTION

1. Field of the Invention

The present invention relates to a backlight assembly, and more particularly, to a backlight assembly and liquid crystal display device having the same.

2. Discussion of the Related Art

There are various types of flat panel displays, for example, plasma display panels, field emission displays, light emitting diodes, liquid crystal displays, and the like.

Liquid crystal display devices display images by controlling the transmittance of light from an external source. Hence, LCDs are incapable of displaying images in the dark without a light source.

To solve this problem, backlight assemblies have been developed to provide a light source for the LCD when there is insufficient external light to display an image, for example, in a dark room. Generally, it is desirable for a backlight assembly to provide high luminance, high efficiency, luminance uniformity, long endurance, slimness, lightweight, low price, and the like.

Generally the lamps utilized in the backlight assembly are either cold cathode fluorescent lamps (CCFL) or external electrode fluorescent lamps (EEFL). Although the CCFL provides high luminance, its increased cost compared to the EEFL has resulted in increased research and development of EEFL backlight assemblies.

FIG. 1 is a layout of an EEFL backlight assembly of the related art, and FIG. 2 is a magnified perspective diagram of area-A of the backlight assembly in FIG. 1.

Referring to FIG. 1 and FIG. 2, the backlight assembly according to the related art includes: a plurality of external electrode fluorescent lamps (EEFLs) 1 each of which has a positive and negative electrode 2 and 3 positioned at opposite ends of each lamp; and common positive and negative electrode parts 4 and 5 having fitting portions 6 to allow the positive and negative electrodes 2 and 3 of the EEFLs 1 to be fitted therein. The fitting portions 6 are integral to the common positive and negative electrode parts 4 and 5, respectively, thereby electrically connecting the fitting portions 6 to the common positive and negative electrode parts 4 and 5.

As illustrated in FIG. 1, the distance between the common positive electrode part 4 and the negative electrode part 5 is equal to the length of an EEFL 1.

The positive and negative electrodes 2 and 3 of each of the EEFLs 1 are fitted in the fitting portions 6 provided on the common positive and negative electrode parts 4 and 5, respectively. Hence, the EEFLs 1 are connected parallel to the common positive and negative electrode parts 4 and 5.

When a high voltage is applied to the common positive and negative electrode parts 4 and 5, the voltage is supplied simultaneously to the respective positive and negative electrodes 2 and 3 of the EEFLs 1 via the fitting portions 6, thereby simultaneously producing light from each of the EEFLs 1.

The above-configured backlight assembly is suitable for a small-screen liquid crystal display panel. Since the small-screen liquid crystal display panel has a relatively small size, the number of EEFLs required in the backlight assembly is small. However, for a wide-screen liquid crystal display panel, the number of EEFLs increases in proportion to the corresponding screen size. As a result, the tube current flowing in each EEFL is reduced in proportion to the number of EEFLs such that the intensity of light may be lowered. To compensate for the reduced tube current, a higher voltage can be applied. Yet, in such a case, current consumption increases.

An EEFL having a U-type symmetric structure has been proposed to lower the number of EEFLs. A pair of the related art straight EEFLs, as illustrated in FIG. 1, can be replace by an U-type EEFL so that current consumption is reduced. Both end portions of the EEFL having the U-type symmetric structure are aligned on the same line.

However, as both of the end portions of a symmetric U-type EEFL are aligned on the same line to connect the U-type EEFL to the common positive and negative electrode parts, the common positive and negative electrode parts are situated on the same line, whereby a short circuit may occur.

SUMMARY OF THE INVENTION

Accordingly, the present invention is directed to a backlight assembly and liquid crystal display device having the same that substantially obviates one or more of the problems due to limitations and disadvantages of the related art.

An advantage of the present invention is to provide a backlight assembly and liquid crystal display device having the same, in which a plurality of U-type external electrode fluorescent lamps (EEFLs) are connected to common electrode parts such that the occurrence of short circuits is reduced or prevented.

Additional features and advantages of the invention will be set forth in the description which follows, and in part will be apparent from the description or may be learned from practice of the invention. The features and other advantages of the invention will be realized and attained by the structure particularly pointed out in the written description and claims hereof as well as the appended drawings.

To achieve these and other advantages and in accordance with the purpose of the invention, as embodied and broadly described herein, a backlight assembly is provided comprising: a plurality of aligned bent-shape external electrode fluorescent lamps (EEFLs), each EEFL having a first and a second external electrode, wherein the first external and second external electrodes of the plurality of EEFLs are positioned on first and second planes, respectively; a first common electrode part supplying power to the first external electrodes in common; and a second common electrode part supplying power to the second external electrodes in common.

In another aspect of the present invention, a backlight assembly, is provided, comprising: a plurality of external electrode fluorescent lamps (EEFLs); and a first and a second common electrode part simultaneously supplying AC power to the plurality of EEFLs, the first and the second common electrode parts being substantially bar-shaped, wherein both the first and the second common electrode parts are positioned at one side of an irradiation area of the backlight assembly.

In another aspect of the present invention, a liquid crystal display device is provided, comprising: a plurality of aligned bent-shaped external electrode fluorescent lamps (EEFLs), each EEFL having a first and a second external electrode, the first external electrodes and the second external electrodes of the plurality of EEFLs positioned on a first and second plane respectively; a first common electrode part simultaneously supplying power to the first external electrodes; a second common electrode part simultaneously supplying power to the second external electrodes; and a liquid crystal display panel.

In another aspect of the present invention, a liquid crystal display device is provided, comprising: a plurality of external electrode fluorescent lamps (EEFLs) incorporated in a backlight assembly, and a first and a second common electrode parts simultaneously supplying AC power to the plurality of EEFLs, the first and the second common electrode parts being substantially bar-shaped, wherein both the first and the second common electrode parts are positioned in a side part of an irradiation area of the backlight assembly, and a liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 3:
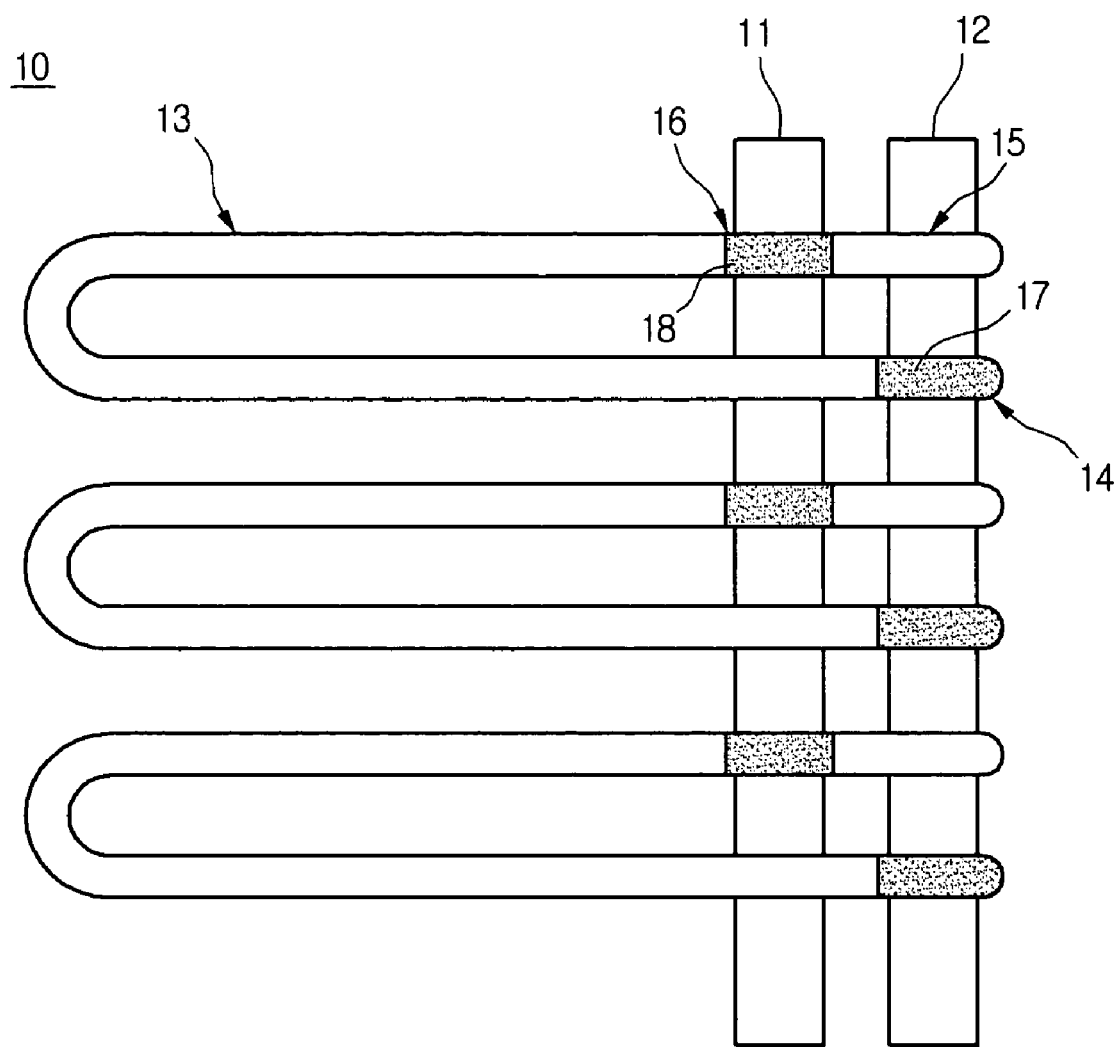
FIG. 3 is a layout of an EEFL backlight assembly according to an embodiment of the present invention.

FIG. 3 is a layout of an EEFL backlight assembly according to an embodiment of the present invention. As illustrated in FIG. 3, the backlight assembly 10, includes: a plurality of EEFLs 13; a common positive electrode part 11 supplied with a common positive voltage (+); and a common negative electrode part 12 provided with a common negative voltage (−). The common negative and positive electrode parts 12 and 11 are positioned parallel to each other with a predetermined distance in-between. The plurality of EEFLs 13 are electrically connected to the common positive and negative electrode parts 11 and 12 via external electrodes positioned on each of the EEFLs 13. Each of the EEFLs 13 has a symmetric U-type shape wherein both end portions 14 and 15 of each EEFLs are aligned on the same line.

Each EFFL 13 includes a positive electrode 18 positioned to correspond with the common positive electrode part 11, and a negative electrode 17 positioned to correspond to the common negative electrode part 12.

The EEFLs 13 are arranged perpendicular to the common positive and negative electrode parts 11 and 12.

As illustrated in FIG. 3, the common negative electrode part 12 is arranged at an end portion 14 of each of the EEFLs 13, and the common positive electrode part 11 is arranged at a portion 16 which is a predetermined distance from each of the end portions 14 of the EEFLs 13. Moreover, the common positive and negative electrode parts 11 and 12 may have a rectangular bar shape.

A plurality of fitting portions (not shown) may be provided on an upper surface of the common positive and negative electrode parts 11 and 12 so that the EEFLs 13 can be fitted therein. The fitting portions may be integral to the common positive and negative electrode parts 11 and 12, respectively. Therefore, when a high voltage is applied to the common positive and negative electrode parts 11 and 12, the voltage is simultaneously supplied to the EEFLs 13 via the fitting portions.

Since a high voltage, for example, several hundred volts, is applied between the common positive and negative electrode parts 11 and 12, it is highly probable that the common positive and negative electrode parts 11 and 12, if they are arranged close to each other, may be short-circuited. So, the common positive and negative electrode parts 11 and 12 need to be separated enough not to short-circuit. Such an arrangement design can be optimized through tests.

The negative electrode 17 is formed at one end portion 14 of each EEFL 13 to correspond to the common negative electrode part 12, and the positive electrode 18 is formed at a portion 16 that is a predetermined distance from the other end portion 15 of each EEFL 13 to correspond to the common positive electrode part 11. Both of the end portions 14 and 15 of each EEFL are aligned on the same line. The negative electrode 17 has a cap shape so that the end portion 14 of each of the EEFLs 13 can be fitted therein, and a conductive material can be directly coated on the end portion 14. The positive electrode 18 has a tape shape so as to be attached to the portion 16 leaving the predetermined distance from the other end portion 15 of each of the EEFLs 13 to correspond to the common positive electrode part 11, and a conductive material can be directly coated on the portion 16.

Alternatively, the common positive and negative electrode parts 11 and 12 can be reversely arranged. More particularly, the common positive electrode part 11 may be arranged at the end portion 14 of each of the EEFLs 13 and the common negative electrode part 12 may be arranged to leave a predetermined distance from the common positive electrode part 11. In this case, the position of the positive and negative electrodes 18 and 17 of the EEFLs 13 need not to be changed. Since the positive and negative electrodes 18 and 17 are named for convenience of explanation, a negative voltage (−) can be supplied to the positive electrode 18, and vice versa.

When a high voltage is applied between the common positive and negative electrode parts 11 and 12, the voltage is simultaneously supplied to each of the EEFLs 13 via the fitting portions provided on the common positive and negative electrode parts 11 and 12. As a result, light is simultaneously produced from the EEFLs 13.

By fitting the symmetric U-type EEFLs 13 in the common positive and negative electrode parts 11 and 12, according to the invention, the possibility of a short circuit between the common positive and negative electrode parts 11 and 12 is reduce. Therefore, by using the symmetric U-type EEFLs 13, the backlight assembly 10 according to this embodiment of the present invention is easily applicable to a wide-screen liquid crystal display device sensitive to current consumption.

Figure 4:
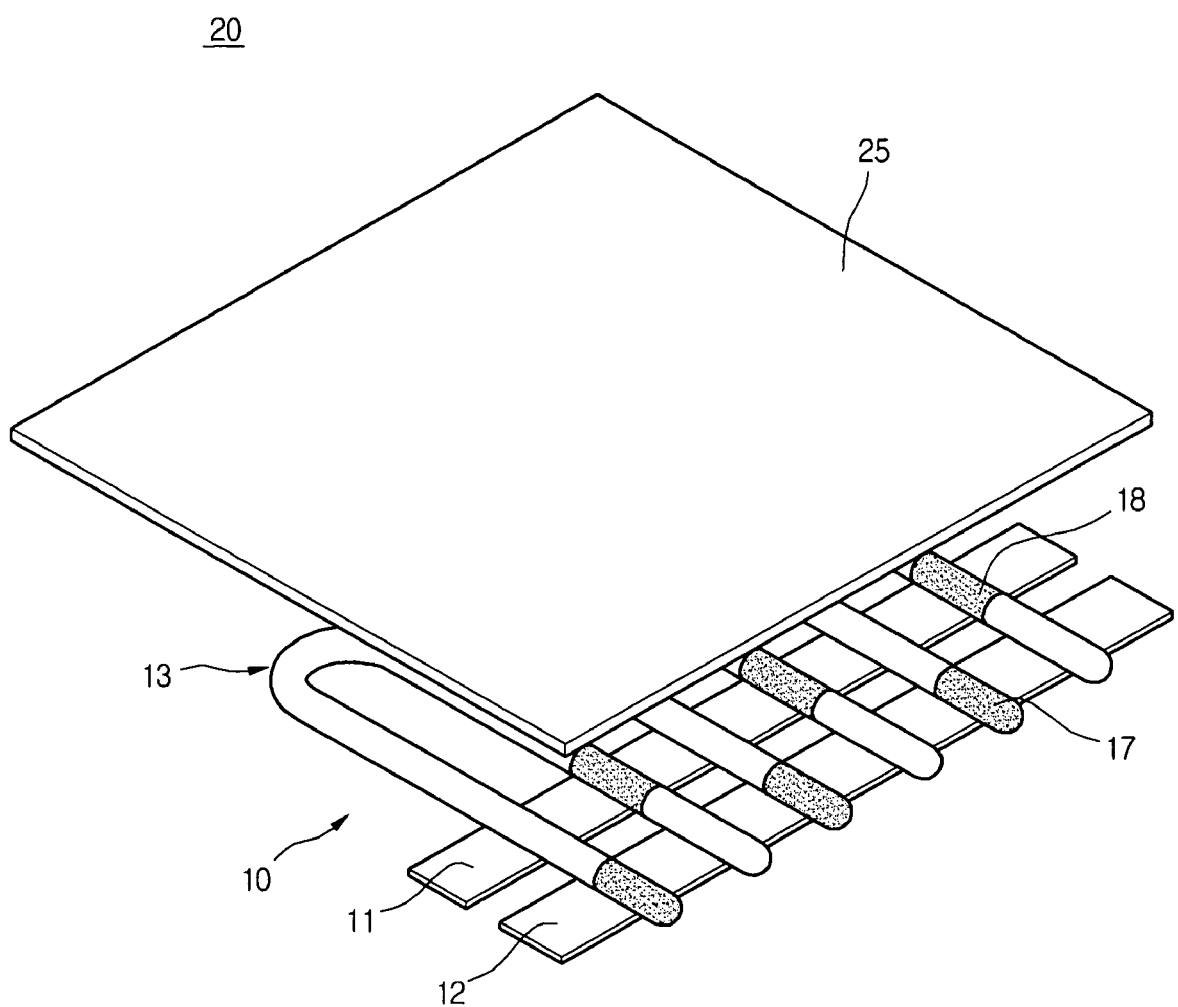
FIG. 4 is a perspective diagram of a liquid crystal display device having the backlight assembly of FIG. 3.

FIG. 4 is a perspective diagram of a liquid crystal display device having the backlight assembly of FIG. 3. As illustrated in FIG. 4, the liquid crystal display device 20 includes a backlight assembly 10 and a liquid crystal display panel 25 arranged over the backlight assembly 10. The LCD displays images thereon by controlling the transmissivity of the light supplied from the backlight assembly 10.

The liquid crystal display device 20 may further include a case (not shown) to support the backlight assembly 10. The backlight assembly 10 is positioned at the bottom (or behind) the liquid crystal display panel 25 to supply light to the liquid crystal display panel 25. The liquid crystal display panel 25 displaces liquid crystals by an electric field according to a prescribed voltage and controls the transmissivity of the light supplied from the backlight assembly 10 according to the displacement of the liquid crystals to display a prescribed image thereon.

As mentioned in the foregoing description, in the backlight assembly 10, the common positive and negative electrode parts 11 and 12 are arranged parallel to each other with a predetermined distance in-between, the positive electrodes 18 of the symmetric U-type EEFLs 13 are electrically connected to the common positive electrode part 11, and the negative electrodes 17 are electrically connected to the common negative electrode part 13. More particularly, the plurality of EEFLs 13 are electrically connected to the common positive and negative electrode parts 11 and 12 using fitting portions electrically connected to the common positive and negative electrode parts 11 and 12.

When a high voltage is applied between the common positive and negative electrode parts 11 and 12, the voltage is simultaneously supplied to the EEFLs 13 via the fitting portions. So, light is simultaneously produced from the EEFLs 12 to be supplied to the liquid crystal display panel 25.

The liquid crystal display panel 25 includes first and second substrates bonded together with a gap there between which is filled with liquid crystals. Gate and data lines are provided to the first substrate and a pixel area is defined at each crossing between the gate and data lines. A thin film transistor and a pixel electrode are formed in the pixel area. The second substrate includes color filters corresponding to the pixel area, a black matrix provided between the color filters, and a common electrode over the color filters and the black matrix. If the gate lines are sequentially driven to turn on the thin film transistor, a data voltage supplied via the data lines is applied to the pixel electrode to generate an electric field attributed to a voltage difference from a common voltage applied to the common electrode. As the liquid crystals are displaced by the electric field, the transmissivity of the light supplied from the backlight assembly 10 is controlled to display images.

Figure 5:
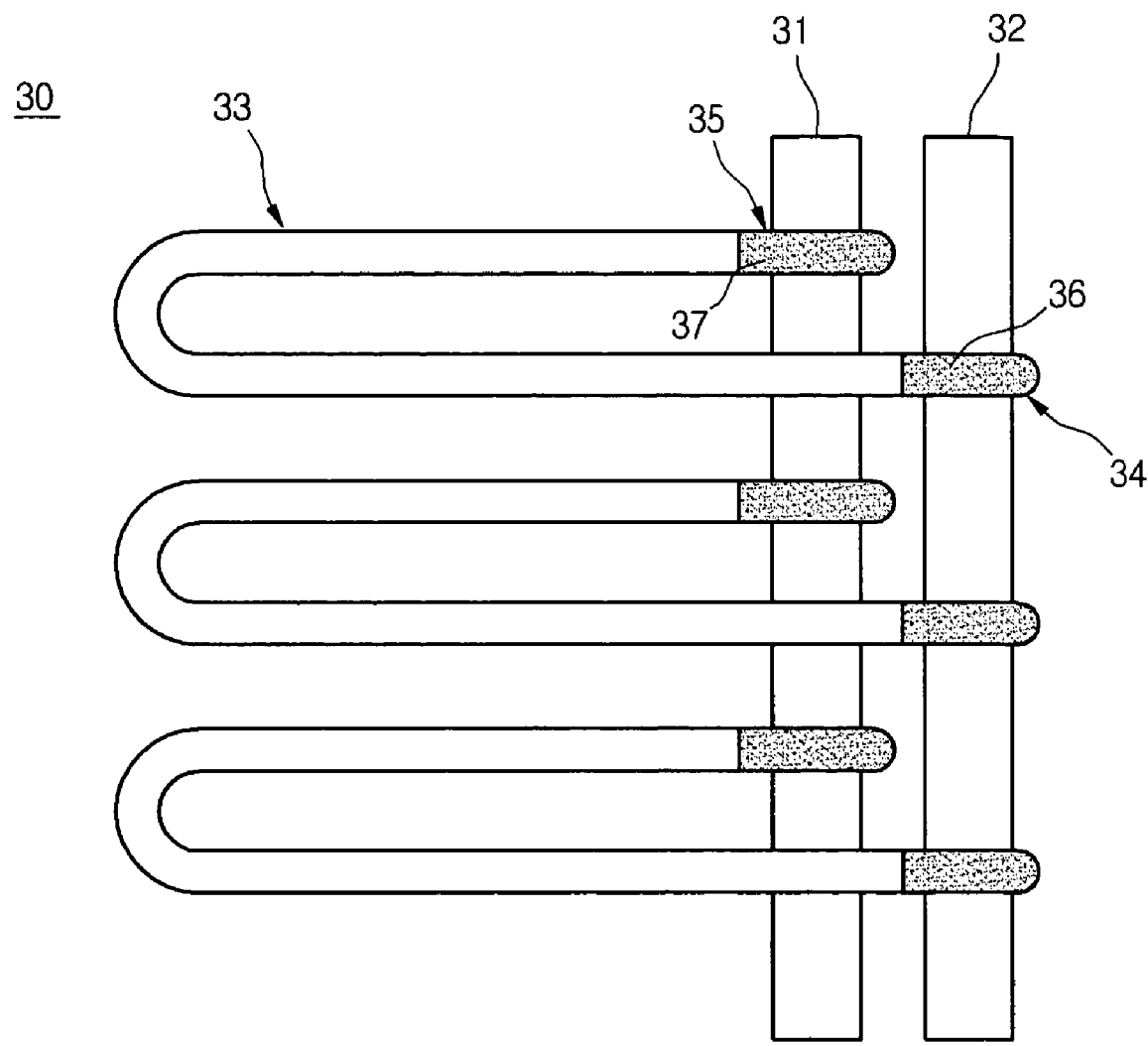
FIG. 5 is a layout of an EEFL backlight assembly according to another embodiment of the present invention.

FIG. 5 is a layout of an EEFL backlight assembly according to another embodiment of the present invention. As illustrated in FIG. 5, the backlight assembly 30 according to this embodiment of the present invention includes: a plurality of EEFLs 33; a common positive electrode part 31 supplied with a common positive voltage (+); and a common negative electrode part 32 provided with a common negative voltage (−). The common positive and negative electrode parts 31 and 32 are positioned parallel to each other with a predetermined distance in-between. The plurality of EEFLs 33 are electrically connected to the common positive and negative electrode parts 31 and 32. Each of the EEFLs 33 has an asymmetric U-type shape such that end portions 34 and 35 of each EEFL 33 are not aligned on the same line.

In addition, each EEFL has a positive electrode 37 at one end that corresponds to the common positive electrode part 31, and a negative electrode 36 at the other end that correspond to the common negative electrode part 32. The EEFLs 33 are arranged perpendicular to the common positive and negative electrode parts 31 and 32.

Since the EEFLs 33 have an asymmetric U-type structure, the end portions 34 and 35 of each of the EEFLs are situated at different lines, respectively. More particularly, an end portion 34 of each of the EEFLs 33 may be extended longer than the other end portion 35 of each EEFL 33. Therefore, the common negative electrode part 32 is arranged at one end portion of the EEFLs 33 and the common positive electrode part 31 is arranged at the other end portion of the EEFLs 33. Moreover, each of the common positive and negative electrode parts 31 and 32 may have a rectangular bar shape.

A plurality of fitting portions (not shown) may be provided on an upper surface of the common positive and negative electrode parts 31 and 32 so that the EEFLs 33 may be fitted therein.

The negative electrode 36 is formed at one end portion 34 of each of the EEFLs 33 to correspond to the common negative electrode part 32, and the positive electrode 37 is formed at the other end portion 35 of each of the EEFLs 33 to correspond to the common positive electrode part 31. As mentioned in the foregoing description, both of the end portions 34 and 35 of the EEFLs 33 are situated on different lines, respectively. The negative electrode 36 has a cap shape so that the end portion 34 of each of the EEFLs 33 can be fitted therein. The positive electrode 37 has a cap so that the end portion 35 of each of the EEFLs 33 can be fitted therein. In addition, a conductive material may be directly coated on the end portions 34 and 35.

Alternatively, the common positive and negative electrode parts 31 and 32 may be reversed. More particularly, the common negative electrode part 32 is arranged at the end portion 36 of each of the EEFLs 33 and the common positive electrode part 31 is arranged to the other end portion 35 of each of the EEFLs 33.

When a high voltage is applied between the common positive and negative electrode parts 31 and 32, the voltage is simultaneously supplied to the EEFLs 33 via the fitting portions (not shown) provided on the common positive and negative electrode parts 31 and 32. Therefore, light is simultaneously produced from each of the EEFLs 33.

By fitting the asymmetric U-type EEFLs 13 in the common positive and negative electrode parts 31 and 32 as illustrated in FIG. 5, it is possible to decrease the number of EEFLs required, while decreasing the possibility of a short circuit between the common positive and negative electrode parts 31 and 32. Accordingly, the backlight assembly 30 according to this embodiment of the present invention is easily applicable to a wide-screen liquid crystal display device sensitive to current consumption.

Figure 6A:
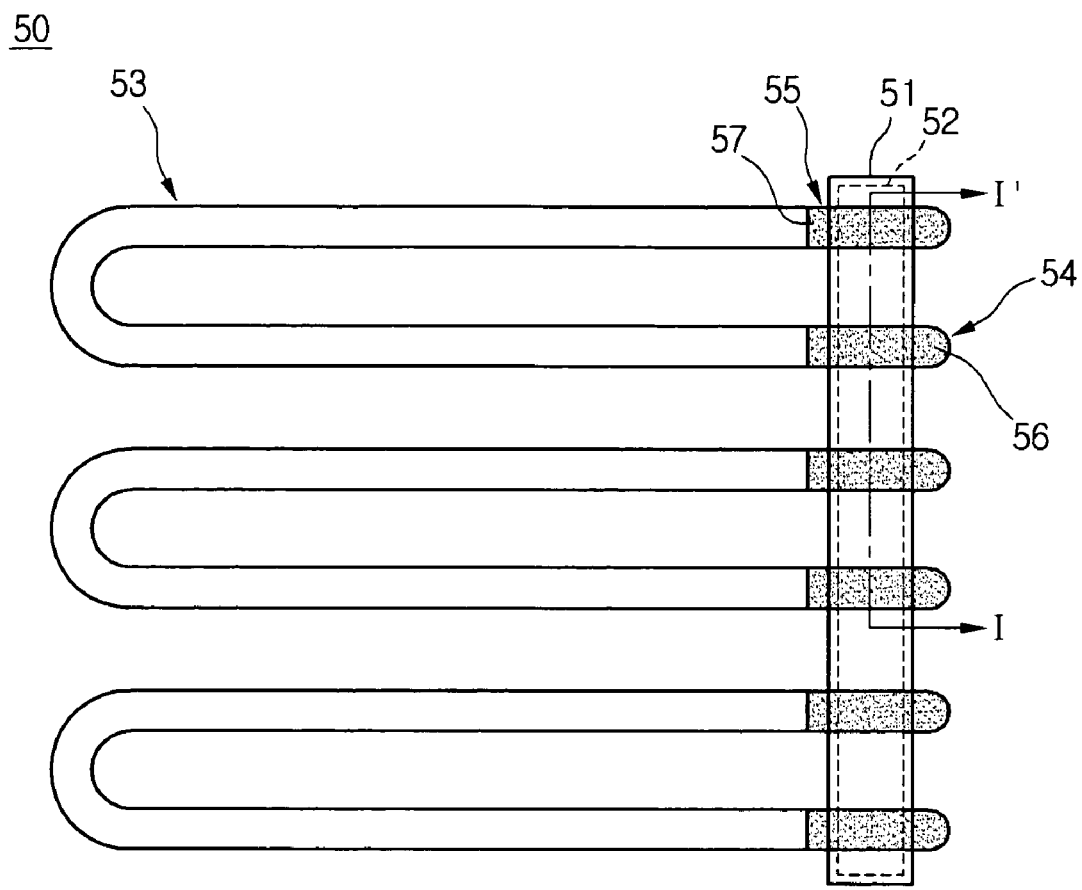
FIGS. 6A through 6E illustrate other embodiments of the present invention.
Figure 6B:
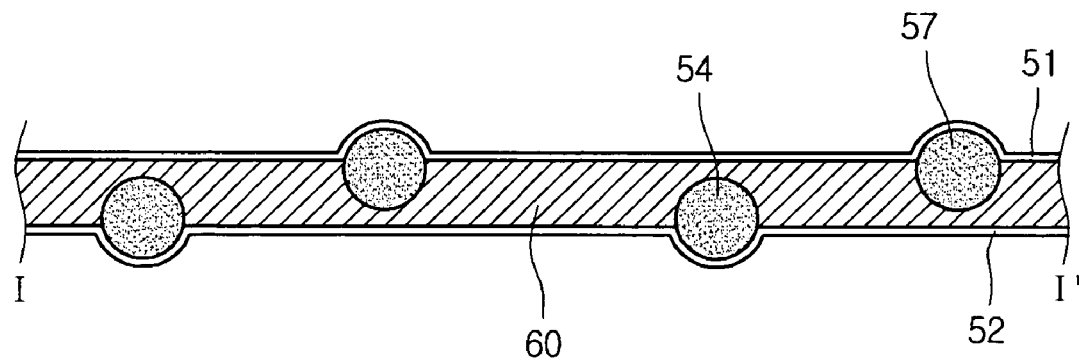

FIGS. 6A to 6E illustrate other embodiments of the present invention. As illustrated in FIG. 6A, the ends 54 and 55 of the U-type EEFLs align in a single line where they are attached to common negative and positive electrode parts 51 and 52 respectively, in what is referred herein as a "sandwich type" structure which allows for a wider effective irradiation area of the backlight assembly. In the embodiment illustrated in FIG. 6B, the external electrodes 54 and 57 of each of a plurality of U-type EEFLs are arranged in different heights, and inserted between the common electrode parts 51 and 52. An insulating layer 60 is inserted between the common electrode parts 51 and 52 to insulate the external electrodes 57 and 54 from the common electrode parts 52 and 51, respectively. The insulating layer 60 may be a gel or a sheet. This structure allows a wider effective irradiation area of the backlight assembly.

Figure 6C:
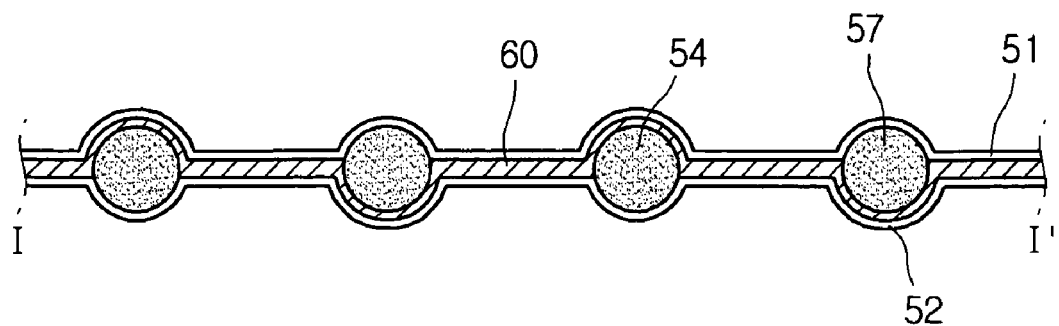

According to another embodiment illustrated in FIG. 6C, the external electrodes 54 and 57 are arranged at the same height, and the common electrode parts 51 and 52 are formed so as not to contact the opposite polarity of the common electrode part and external electrodes to each other. This allows for easier manufacturing as compared to the backlight assembly illustrated in FIG. 6B.

Figure 6D:
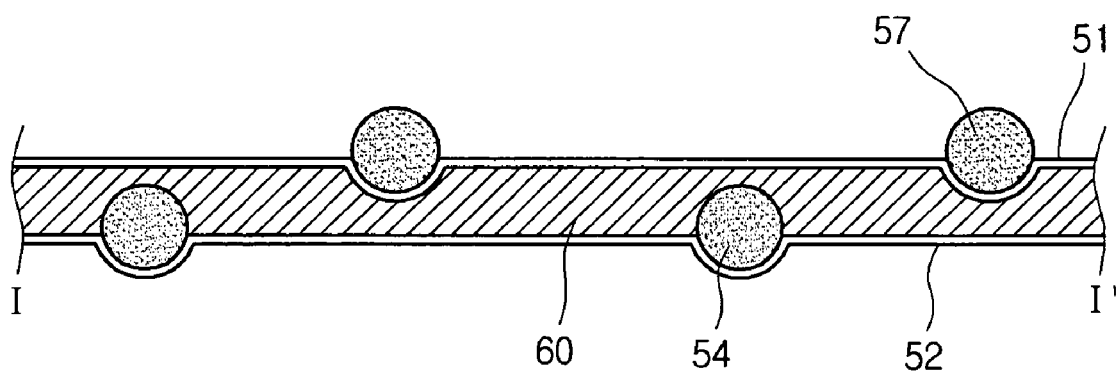
Figure 6E:
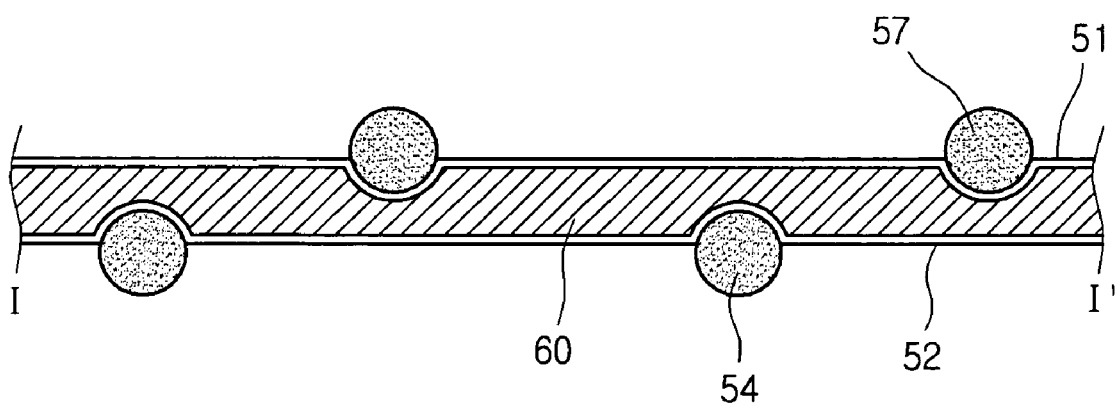

According to still further embodiments of the invention, one or both of the external electrodes 54, 57 are placed on the outside surface of the common electrode parts 51, 52 as illustrated in FIGS. 6D and 6E, respectively. This structure allows for easier manufacturing of the backlight assembly.

Figure 1:
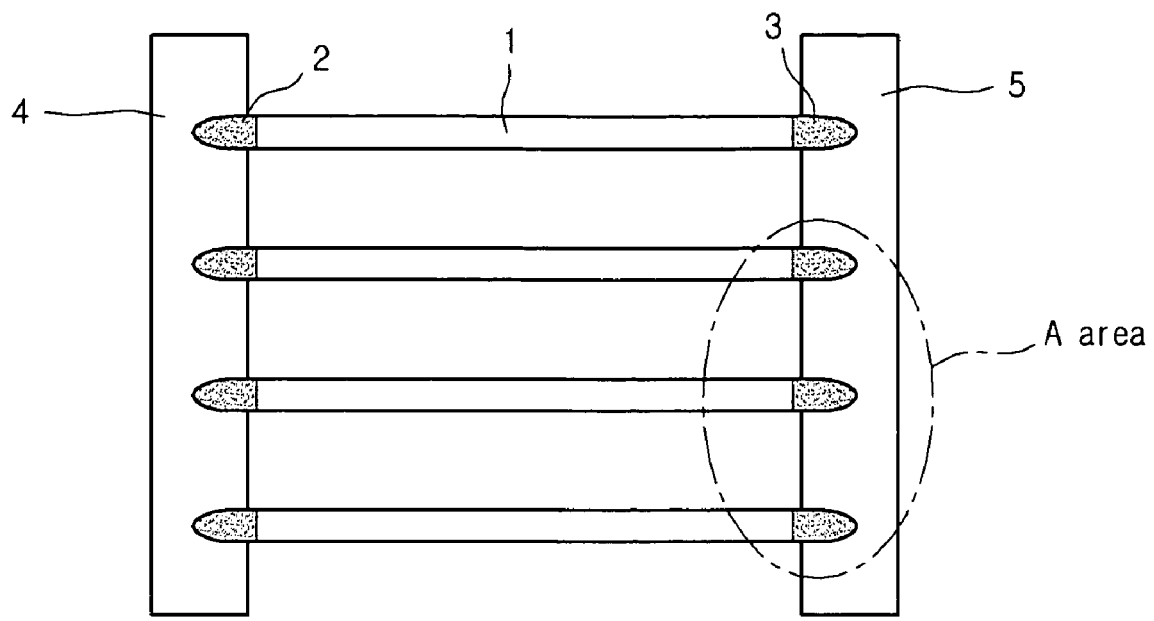
FIG. 1 is a layout of an EEFL backlight assembly according to the related art.
Figure 2:
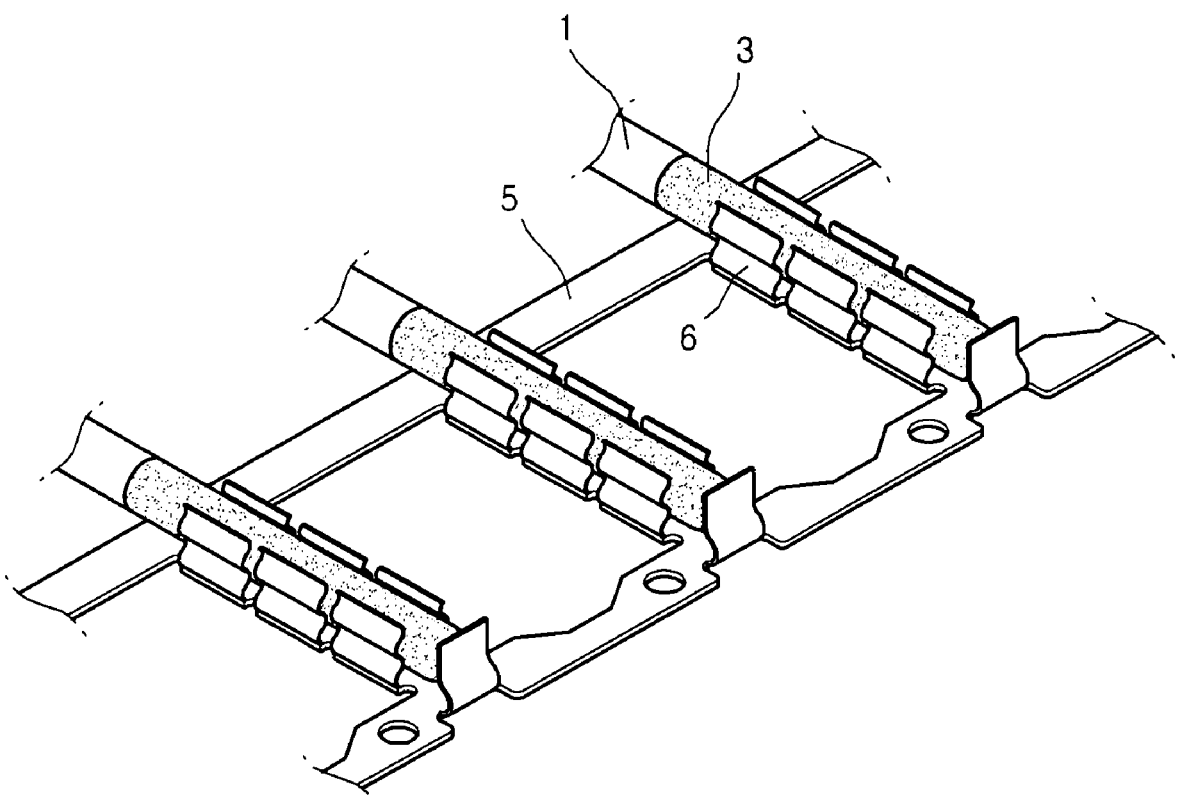
FIG. 2 is a magnified perspective diagram of area-A of the backlight assembly in FIG. 1.

In addition, as shown in the various embodiments above, both common electrode parts are positioned in one area of the backlight assembly. This structure contributes to shorter wirings than the related art shown in FIG. 1, wherein the common electrode parts are position on opposite sides of the backlight assembly. This reduces manufacturing costs and noise problems due to the wirings. Although the above embodiments are all illustrated with a U-type EEFL, the structural features of the common electrode parts are applicable to any bent-shape EEFL.

Accordingly, in the present invention, the electrodes of the U-type EEFLs are safely connected to the common electrodes without short circuit occurrence, respectively, whereby the backlight assembly can lower the current consumption.

And, the backlight assembly according to the present invention is easily applicable to a wide-screen liquid crystal display device sensitive to the current consumption, whereby an application range of the backlight assembly can be extended.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight assembly comprising:
a plurality of aligned bent-shape external electrode fluorescent lamps (EEFLs), each EEFL having a first and a second external electrode, wherein the first external and second external electrodes of the plurality of EEFLs are positioned on first and second common electrode parts, respectively;
a first common electrode part supplying power to the first external electrodes in common; and
a second common electrode part supplying power to the second external electrodes in common,
wherein the first common electrode part and the second common electrode part are parallel to each other and spaced a predetermined distance apart,
wherein the first and the second external electrodes are positioned at respective ends of each EEFL,
wherein each EEFL is asymmetrically U-shape,
wherein an end portion of each of the EEFL be extended longer than the other end portion of each of the EEFL,
wherein each of the first and the second common electrode parts have rectangular bar shape,
wherein bent-shaped regions of plurality of EEFLs are disposed adjacently.

2. A backlight assembly, comprising:
a plurality of aligned bent-shaped external electrode fluorescent lamps (EEFLs), each EEFL having a first and a second external electrode; and a first and a second common electrode part simultaneously supplying power to the plurality of EEFLs, the first and the second common electrode parts being substantially bar-shaped, wherein the first and the second common electrode parts overlap each other, and are connected to the first and second external electrodes, respectively;
an insulating layer inserted between the first and the second common electrode parts to insulate the first and the second external electrodes from the first and the second common electrode parts from the second and the first common electrode parts, respectively,
wherein both the first and the second common electrode parts are positioned at one side of an irradiation area of the backlight assembly.

3. A liquid crystal display device, comprising:
a plurality of aligned bent-shaped external electrode fluorescent lamps (EEFLs), each EEFL having a first and a second external electrode, the first external electrodes and the second external electrodes of the plurality of EEFLs positioned on a first and second common electrode parts respectively;
a first common electrode part simultaneously supplying power to the first external electrodes;
a second common electrode part simultaneously supplying power to the second external electrodes; and
a liquid crystal display panel,
wherein the first common electrode part and the second common electrode part are parallel to each other and spaced a predetermined distance apart,
wherein the first and the second external electrodes are positioned at respective ends of each EEFL,
wherein each EEFL is asymmetrically U-shaped,
wherein an end portion of each of the EEFL be extended longer than the other end portion of each of the EEFL,
wherein each of the first and the second common electrode parts have rectangular bar shape,
wherein bent-shaped regions of plurality of EEFLs are disposed adjacently.

4. A liquid crystal display device, comprising:
a plurality of aligned bent-shaped external electrode fluorescent lamps (EEFLs) incorporated in a backlight assembly each EEFL having a first and a second external electrode, and
a first and a second common electrode parts simultaneously supplying power to the plurality of EEFLs, the first and the second common electrode parts being substantially bar-shaped, wherein the first and the second common electrode parts are overlapped each other, and are connected to the first and second external electrodes, respectively;
an insulating layer inserted between the first and the second common electrode parts to insulate the first and the second external electrodes from the first and the second common electrode parts from the second and the first common electrode parts, respectively,
wherein both the first and the second common electrode parts are positioned in a side part of an irradiation area of the backlight assembly, and
a liquid crystal display panel.

* * * * *